(12) United States Patent
Brust et al.

(10) Patent No.: US 8,187,371 B2
(45) Date of Patent: May 29, 2012

(54) PIGMENT BASED INKS FOR HIGH SPEED DURABLE INKJET PRINTING

(75) Inventors: Thomas B. Brust, Webster, NY (US); Michael J. Carmody, Webster, NY (US); Robert H. Fehnel, Rochester, NY (US); Gary L. House, Victor, NY (US); Mark E. Irving, Rochester, NY (US); Yongcai Wang, Webster, NY (US); Paul D. Yacobucci, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 583 days.

(21) Appl. No.: 12/029,929

(22) Filed: Feb. 12, 2008

(65) Prior Publication Data
US 2008/0207820 A1    Aug. 28, 2008

Related U.S. Application Data

(60) Provisional application No. 60/892,158, filed on Feb. 28, 2007.

(51) Int. Cl.
C09D 1/00 (2006.01)
C09D 11/00 (2006.01)
C09D 11/02 (2006.01)

(52) U.S. Cl. ............... 106/31.25; 106/31.6; 523/160; 524/500; 524/507; 524/503

(58) Field of Classification Search ............ 523/160; 524/507, 500, 503; 106/31.25, 31.6
See application file for complete search history.

(56) References Cited

U.S. PATENT DOCUMENTS

| | | |
|---|---|---|
| 5,140,090 A | 8/1992 | Champion et al. |
| 5,352,729 A | 10/1994 | Birkhofer et al. |
| 6,136,890 A | 10/2000 | Carlson et al. |
| 6,206,586 B1 | 3/2001 | Wen et al. |
| 6,268,101 B1 | 7/2001 | Yacobucci et al. |
| 6,428,157 B1 | 8/2002 | Wen |
| 6,533,408 B1 | 3/2003 | Erdtmann et al. |
| 6,543,888 B2 | 4/2003 | Nishita |
| 6,604,819 B2 | 8/2003 | Nishita |
| 6,723,784 B2 | 4/2004 | Ito et al. |
| 6,794,425 B1 | 9/2004 | Ellis et al. |
| H2113 H | 1/2005 | Nichols et al. |
| 6,866,379 B2 | 3/2005 | Yau et al. |
| 2003/0166742 A1 | 9/2003 | Hirasa et al. |
| 2004/0085419 A1 | 5/2004 | Yau et al. |
| 2004/0130608 A1 | 7/2004 | Campbell et al. |
| 2004/0229976 A1 | 11/2004 | Kakiuchi et al. |
| 2004/0242726 A1 | 12/2004 | Waki et al. |
| 2005/0004284 A1 | 1/2005 | Koenemann et al. |
| 2006/0100306 A1 | 5/2006 | Yau et al. |
| 2006/0100307 A1 | 5/2006 | Uerz et al. |
| 2006/0100308 A1 | 5/2006 | Yau et al. |
| 2006/0223908 A1* | 10/2006 | Szajewski et al. ............ 523/160 |
| 2007/0259120 A1 | 11/2007 | Haubennestel et al. |
| 2008/0206465 A1 | 8/2008 | Han-Adebekun et al. |
| 2008/0207805 A1 | 8/2008 | Blease et al. |
| 2008/0207811 A1 | 8/2008 | Brust et al. |

FOREIGN PATENT DOCUMENTS

| | | |
|---|---|---|
| EP | 1 416 006 | 5/2004 |
| EP | 1 849 840 | 10/2007 |
| EP | 1 889 885 | 2/2008 |
| JP | 2000-001639 | 1/2000 |
| JP | 2005-290044 | 10/2005 |
| WO | 2006/088158 | 8/2006 |

OTHER PUBLICATIONS

Gang C. Han-Adebekun et al; U.S. Appl. No. 12/029,909, filed Feb. 12, 2008; titled "Aqueous Inkjet Ink Composition".
Thomas B. Brust et al; U.S. Appl. No. 12/029,972, filed Feb. 12, 2008; titled "Pigment Based Inks for High Speed Durable Inkjet Printing".
James W. Blease et al; U.S. Appl. No. 12/029,986, filed Feb. 12, 2008; titled "Inkjet Ink Set for High Image Quality on Photoglossy Paper and Plain Paper".

* cited by examiner

Primary Examiner — James J Seidleck
Assistant Examiner — Deve E Valdez
(74) Attorney, Agent, or Firm — Andrew J. Anderson

(57) ABSTRACT

An ink composition comprising (a) water, (b) pigment particles, (c) at least one humectant, (d) at least one polyurethane having an average molecular weight of at least about 10,000 and a sufficient number of acid groups to provide an acid number from 60 to about 130, and being present at a weight concentration of greater than 0.7%, and (e) at least one water soluble acrylic polymer comprising carboxylic acid groups, present at a weight concentration of greater than 0.6%, wherein the acid groups on the polyurethane and acrylic polymers are at least partially neutralized only with a monovalent inorganic base.

20 Claims, No Drawings

PIGMENT BASED INKS FOR HIGH SPEED DURABLE INKJET PRINTING

CROSS REFERENCE TO RELATED APPLICATION

This 35 USC 111A application claims the benefit of Provisional Application Ser. No. 60/892,158 filed Feb. 28, 2007, the disclosure of which is incorporated by reference herein in its entirety.

Reference is also made to commonly assigned, co-pending Application Publication No. 2008/0207811 (based on Provisional Application Ser. No. 60/892,171 filed Feb. 28, 2007) by Brust et al., Application Publication No. 2008/0206465 (based on Provisional Application Ser. No. 60/892,137 filed Feb. 28, 2007) by Han-Adebekun et. al., and Application Publication No. 2008/0207805 (based on Provisional Application Ser. No. 60/892,176 filed Feb. 28, 2007) by Blease et al., filed of even date herewith.

FIELD OF THE INVENTION

The invention relates generally to the field of pigmented and colorless-ink ink sets for inkjet printing, and in particular to inks which are useful for thermal inkjet printing. More specifically, the invention relates to pigmented and colorless inks for high-speed thermal inkjet printing which result in durable images.

BACKGROUND OF THE INVENTION

Inkjet printing is a non-impact method for producing printed images by the deposition of ink droplets in a pixel-by-pixel manner to an image-recording element in response to digital signals. There are various methods that may be utilized to control the deposition of ink droplets on the image-recording element to yield the desired printed image. In one process, known as drop-on-demand inkjet, individual droplets are projected as needed onto the image-recording element to form the desired printed image. Common methods of controlling the ejection of ink droplets in drop-on-demand printing include thermal bubble formation (thermal inkjet (TIJ)) and piezoelectric transducers. In another process known as continuous inkjet (CIJ), a continuous stream of droplets is generated and expelled in an image-wise manner onto the surface of the image-recording element, while non-imaged droplets are deflected, caught and recycled to an ink sump. Inkjet printers have found broad applications across markets ranging from desktop document and photographic-quality imaging, to short run printing and industrial labeling.

Ink compositions containing colorants used in inkjet printers can be classified as either pigment-based, in which the colorant exists as pigment particles suspended in the ink composition, or as dye-based, in which the colorant exists as a fully solvated dye species that consists of one or more dye molecules. Pigments are highly desirable since they are far more resistant to fading than dyes. However, pigment-based inks have a number of drawbacks. Great lengths must be undertaken to reduce a pigment to a sufficiently small particle size and to provide sufficient colloidal stability to the particles. Pigment-based inks often require a lengthy milling operation to produce particles in the sub-micron range needed for most modern ink applications. If the pigment particles are too large light scattering can have a detrimental effect on optical density and gloss in the printed image.

A second drawback of pigmented inks is their durability after printing, especially under conditions where abrasive forces have been applied to the printed image. Furthermore, the images printed onto an inkjet receiver are susceptible to defects at short time intervals, from immediately after printing to several minutes while the inks are drying. Finally, the durability of the dried image is also subject to environmental factors such as temperature and humidity which, under certain circumstances, can degrade image durability.

To this extent, pigmented inks have been formulated with various polymers, dispersants and other addenda to provide durable images that can withstand post printing physical abuse and environmental conditions. Pigmented inks for inkjet printing have been formulated with acrylic polymers, however, the acrylic polymers alone are insufficient in providing durable images that resist scratches and other forms of physical abuse.

A second class of polymers that have been used as abrasion resistance additives in pigment-based inks are the polyurethanes, or urethane resins as they are sometimes called. U.S. Pat. No. 6,136,890 discloses a pigment-based inkjet ink wherein the pigment particles are stabilized by a polyurethane dispersant. U.S. Patent Application 2004/0242726 discloses a pigment dispersed by a cross-linking step between a resin having a urethane bond and a second water-soluble polymer.

Although polyurethanes are known for their excellent abrasion resistance, they also have a number of drawbacks. For example, not all polyurethane polymers are conducive to jetting from a thermal inkjet head. In particular, water-dispersible polyurethane particles, such as those disclosed in U.S. Pat. Nos. 6,533,408, 6,268,101, Statutory Invention Registration No. U.S. H2113H, and published U.S. patent applications 2004/0130608 and 2004/0229976 are particularly difficult to jet from a thermal inkjet printhead at high firing frequencies.

It is also known in the art of pigment-based inkjet inks to combine a polyurethane with a second polymer, such as an acrylic polymer or polyester. U.S. Pat. No. 6,794,425 discloses a mixture of a hydrophilic polyurethane and a hydrophobic polymer where the molecular weights of polymers are specified. United States Patent Publication Number 2003/0166742 discloses the combination of a polyurethane and a second copolymer where the acid number of the polymers are specified. The acid number of the polyurethane also creates limitations for use in an inkjet printing system. If the acid number of the polyurethane is too high the resulting abrasion resistance of the image can become degraded, especially under conditions of high temperature and high humidity. If the acid number of the polyurethane is too low a substantial amount of particulate polymer will exist and jetability can become degraded.

Colorless or clear inks, which are substantially free of colorants, are also known in the art of inkjet printing. To this end, the use of a colorless ink supplied in a printhead of an inkjet printer has become increasingly popular. The printhead containing the colorless ink is typically part of the same carriage assembly containing colored inks, and the printer is instructed to jet the colorless ink either simultaneously with or, after the colored inks are jetted. U.S. Pat. Nos. 6,428,157 and 6,206,586 describe an inkjet printing apparatus for applying a composition capable of forming a continuous protective overcoat film.

The colorless inks, also known as overcoat solutions or clear ink compositions, are typically formulated with polymer, water, and other components commonly used in aqueous-based inkjet ink formulations, for example, humectants, organic solvents, surfactants and biocides. U.S. Pat. Nos. 6,723,784, 6,604,819 and 6,543,888 describe a coating liquid and image recording method that provides a transparent topcoat for recordings. Jetting an aqueous suspension of fine polymer particles onto a recorded image forms the topcoat. United States Patent Publication numbers 2006/0100306 and 2006/0100308 disclose the use of polyurethanes and mixtures of polyurethanes and acrylic polymers having specified acid numbers for use in colorless ink compositions.

The colorless inks, also known as overcoat solutions or clear ink compositions, are typically formulated with polymer, water, and other components commonly used in aqueous-based inkjet ink formulations, for example, humectants, organic solvents, surfactants and biocides. U.S. Pat. Nos. 6,723,784, 6,604,819 and 6,543,888 describe a coating liquid and image recording method that provides a transparent topcoat for recordings. Jetting an aqueous suspension of fine polymer particles onto a recorded image forms the topcoat. United States Patent Publication numbers 2006/0100306 and 2006/00100308 disclose the use of polyurethanes and mixtures of polyurethanes and acrylic polymers having specified acid numbers for use in colorless ink compositions.

Both pigment and colorless inks can be difficult to jet through inkjet print heads having small nozzle diameters especially by the thermal inkjet printing process. In recent years, thermal inkjet printers have moved to higher jetting frequencies to provide faster printing speeds. Thermal inkjet printers are now capable of printing at jetting frequencies in excess of 10 kHz and the need for higher velocity firings is a highly desirable feature. However, this high frequency firing often comes at the cost of variability in the firing frequency which leads to poor image quality in the final printed image. In addition, the demands of current thermal inkjet printing requires that the nozzles fire for a large number of firings during the life-time of a printer. As an example, a typical inkjet nozzle may be required to fire in excess of $5 \times 10^7$, and up to as many as $1 \times 10^9$, individual firing events without malfunctioning or ceasing to fire altogether.

Problem to be Solved by the Invention

Although the use of polyurethane binders have found use in inkjet printers there remains the need to provide both pigment-based and colorless inks capable of providing durable images and which satisfy the demands of high frequency thermal inkjet printing. It is therefore an object of this invention to provide a pigment-based ink, and an ink set including two or more pigment-based inks and a colorless ink, for inkjet printing whereby each of the pigment-based inks and the colorless ink contain a polyurethane binder which jet from a thermal inkjet printhead at high frequency and with low variability. It is a further objective of the present invention that the pigment-based ink compositions containing the polyurethane binder provide excellent image quality and maintain durability when printed to an inkjet receiver.

SUMMARY OF THE INVENTION

In accordance with one embodiment, the invention is directed towards an ink composition comprising:
(a) water,
(b) pigment particles,
(c) at least one humectant,
(d) at least one polyurethane having an average molecular weight of at least about 10,000 and a sufficient number of acid groups to provide an acid number from 60 to about 130, and being, present at a weight concentration of greater than 0.7%, and (e) at least one water soluble acrylic polymer comprising carboxylic acid groups, present at a weight concentration of greater than 0.6%,
wherein the acid groups on the polyurethane and acrylic polymers are at least partially neutralized only with an monovalent inorganic base.

According to a second embodiment, an ink set is provided comprising two or more pigmented ink compositions of the present invention, wherein at least two of such ink compositions comprise different colored pigment particles. According to a further embodiment, the ink set of the invention further may comprise at least one colorless ink composition comprising:
(a) water
(b) at least one humectant, and
(c) at least one polyurethane having an average molecular weight of at least about 10,000 and a sufficient number of acid groups to provide an acid number from 60 to about 130, wherein the acid groups on the polyurethane are at least partially neutralized only with a monovalent inorganic base.

At least one water soluble acrylic polymer comprising carboxylic acid groups is also preferably present in the colorless ink composition, wherein the acid groups on the acrylic polymer are also at least partially neutralized only with a monovalent inorganic base.

The aqueous ink compositions of the invention can advantageously be jetted from a thermal inkjet device at frequencies of at least 12 kHz with a near nozzle velocity of at least 10 meters/second and have a relatively low velocity variation preferably of less than 2% for at least $5 \times 10^7$ firing events)

DETAILED DESCRIPTION OF THE INVENTION

The inkjet inks of the present invention are aqueous-based inks. By aqueous-based it is meant that the ink comprises mainly water as the carrier medium for the remaining ink components. In a preferred embodiment, the inks of the present invention comprise at least about 50 weight percent water. Pigment-based inks are defined as inks containing at least a dispersion of water-insoluble pigment particles. A colorless ink in the present invention is substantially free from any colorants.

An ink set is defined as a set of two or more inks. The ink sets may contain pigment-based inks of different colors, for example, cyan, magenta, yellow, red, green, blue, orange, violet or black. In one embodiment, a carbon black pigmented ink is used in an ink set comprising at least three inks having separately, a cyan, a magenta and a yellow colorant. Useful ink sets also include, in addition to the cyan, magenta and yellow inks, complimentary colorants such as red, blue, violet, orange or green inks. In addition, the ink set may comprise light and dark colored inks, for example, light cyan and light magenta inks commonly used in the ink sets of wide format printers. It is possible to include one or more inks that comprise a mixture of different colored pigments in the ink set. An example of this is a carbon black pigment mixed with one or more colored pigments or a combination of different colored pigments. An ink set may also include one or more pigment-based inks in combination with one or more colorless inks. An ink set may also include at least one or more pigment-based inks in combination with additional inks that are dye-based ink. An ink set may further comprise one or more self-dispersing carbon black pigment ink, wherein the ink comprises a water soluble polymer containing acid groups neutralized by an inorganic base, and the carbon black pigment comprises greater than 11 weight % volatile surface functional groups as disclosed in commonly assigned, copending US Publication No. 2008/0206465 (based on Provisional Application Ser. No. 60/892,137 filed Feb. 28, 2007), the disclosure of which is incorporated by reference herein.

The pigment-based inks of the present invention comprise pigment particles dispersed in the aqueous carrier. The pigment particles that are useful in the invention may be prepared by any method known in the art of inkjet printing. Useful methods commonly involve two steps: (a) a dispersing or milling step to break up the pigments to primary particles, where primary particle is defined as the smallest identifiable subdivision in a particulate system, and (b) a dilution step in which the pigment dispersion from step (a) is diluted with the remaining ink components to give a working strength ink.

The milling step (a) is carried out using any type of grinding mill such as a media mill, a ball mill, a two-roll mill, a three-roll mill, a bead mill, and air-jet mill, an attritor, or a liquid interaction chamber. In the milling step (a), pigments are optionally suspended in a medium that is typically the same as or similar to the medium used to dilute the pigment dispersion in step (b). Inert milling media are optionally present in the milling step (a) in order to facilitate break up of the pigments to primary particles. Inert milling media include such materials as polymeric beads, glasses, ceramics, metals and plastics as described, for example, in U.S. Pat. No. 5,891,231. Milling media are removed from either the pigment dispersion obtained in step (a) or from the ink composition obtained in step (b).

A dispersant is optionally present in the milling step (a) in order to facilitate break up of the pigments into primary particles. For the pigment dispersion obtained in step (a) or the ink composition obtained in step (b), a dispersant is optionally present in order to maintain particle stability and prevent settling. Dispersants suitable for use in the invention include, but are not limited to, those commonly used in the art of inkjet printing. For aqueous pigment-based ink compositions, useful dispersants include anionic, cationic or nonionic surfactants such as sodium dodecylsulfate, or potassium or sodium oleylmethyltaurate as described in, for example, U.S. Pat. No. 5,679,138, U.S. Pat. No. 5,651,813 or U.S. Pat. No. 5,985,017.

Polymeric dispersants are also known and useful in aqueous pigment-based ink compositions. Polymeric dispersants may be added to the pigment dispersion prior to, or during the milling step (a), and include polymers such as homopolymers and copolymers; anionic, cationic or nonionic polymers; or random, block, branched or graft polymers. Polymeric dispersants useful in the milling operation include random and block copolymers having hydrophilic and hydrophobic portions; see for example, U.S. Pat. No. 4,597,794; U.S. Pat. No. 5,085,698; U.S. Pat. No. 5,519,085; U.S. Pat. Nos. 5,272,201; 5,172,133; U.S. Pat. No. 6,043,297 and WO 2004/11140A1; and graft copolymers; see for example, U.S. Pat. No. 5,231,131; U.S. Pat. No. 6,087,416; U.S. Pat. No. 5,719,204; or U.S. Pat. No. 5,714,538.

Typically, these polymeric resins are copolymers made from hydrophobic and hydrophilic monomers. In this case, the copolymers are designed to act as dispersants for the pigment by virtue of the arrangement and proportions of hydrophobic and hydrophilic monomers. The pigment particles are colloidally stabilized by the dispersant and are referred to as a polymer dispersed pigment dispersion. The pigment dispersions useful in pigment-based ink composition desirably have a median particle diameter of less than 200 nm and more preferably less than 100 nm. In a preferred embodiment, 90 percent of the weight of the pigment particles in the distribution have a diameter less than 100 nm and more preferably less than 80 nm.

The polymeric dispersant (copolymer) for the pigment is not limited in the arrangement of the monomers comprising the copolymer. The arrangement of monomers may be totally random, or they may be arranged in blocks such as AB or ABA wherein, A is the hydrophobic monomer and B is the hydrophilic monomer. In addition, the polymer make take the form of a random terpolymer or an ABC tri-block wherein, at least one of the A, B and C blocks is chosen to be the hydrophilic monomer and the remaining blocks are hydrophobic blocks dissimilar from one another.

The inks of the invention may also comprise self-dispersing pigments that are dispersible without the use of a dispersant. Pigments of this type are those that have been subjected to a surface treatment such as oxidation/reduction, acid/base treatment, or functionalization through coupling chemistry. The surface treatment can render the surface of the pigment with anionic, cationic or non-ionic groups. Examples of self-dispersing type pigments include, but are not limited to, Cab-O-Jet® 200 and Cab-O-Jet® 300 (Cabot Corp.) and Bonjet® Black CW-1, CW-2, and CW-3 (Orient Chemical Industries, Ltd.).

Pigments suitable for use in the invention include, but are not limited to, azo pigments, monoazo pigments, disazo pigments, azo pigment lakes, β-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black.

Typical examples of pigments that may be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 491:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Blue 1, 2, 9, 10, 14, 15:1, 15:2, 15:3, 15:4, 15:6, 15, 16, 18, 19, 24:1, 25, 56, 60, 61, 52, 63, 64, 66, bridged aluminum phthalocyanine pigments; C.I. Pigment Black 1, 7, 20, 31, 32; C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Green 1, 2, 4, 7, 8, 10, 36, 45; C.I. Pigment Violet 1, 2, 3, 5:1, 13, 19, 23, 25, 27, 29, 31, 32, 37, 39, 42, 44, 50; or C.I. Pigment Brown 1, 5, 22, 23, 25, 38, 41, 42.

Ink compositions, both pigment-based and colorless, useful in the invention also comprise a humectant in order to achieve high frequency firing with low variability. Representative examples of humectants which may be employed in the present invention include; (1) triols, such as; glycerol, 1,2,6-hexanetriol, 2-ethyl-2-hydroxymethyl-propane diol, trimethylolpropane, alkoxlated triols, alkoxylated pentaerythritols, saccharides and sugar alcohols, (2) diols, such as ethylene glycol, diethylene glycol, triethylene glycol, propylene glycol, polyalkylene glycols having four or more alkylene oxide groups, 1,3-propane diol, 1,2-butane diol, 1,3-butane diol, 1,4-butane diol, 1,2-pentane diol, 1,5-pentanediol, 1,2-hexanediol, 1,6-hexane diol, 2-methyl-2,4-pentanediol, 1,2-heptane diol, 1,7-hexane diol, 2-ethyl-1,3-hexane diol, 1,2-octane diol, 2,2,4-trimethyl-1,3-pentane diol, 1,8-octane diol; and thioglycol, or a mixture thereof.

The preferred humectant(s) of the present invention is defined as a water miscible organic solvent having a viscosity of greater than about 40 centapoise at a temperature of 25 degrees Celsius, more preferably greater than about 100 centapoise and most preferably above 500 centapoise. Preferred humectants are polyhydric alcohols having three or more hydroxyl groups. A particularly preferred humectant is glycerol. Typical aqueous-based ink compositions useful in the invention may contain 5-20 weight percent humectant(s), more preferably from about 6-15% humectant, most preferably from about 6-10% humectant. Inks comprising humectants having the aforementioned viscosity and concentration ranges are ideal for maintaining ink viscosities in an acceptable range for high speed firing from a thermal inkjet printhead with low variability in firing frequency.

In a preferred embodiment, the humectant is present in the inkjet ink at ratio of less than or equal to about 10:1 relative to the polyurethane on a weight basis. When the ratio of humectant to polyurethane is maintained in this range the scratch resistance of printed images is excellent.

The ink compositions of the present may also include, in addition to the humectant, a water miscible co-solvent or penetrant. Representative examples of co-solvents used in the aqueous-based ink compositions include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) lower mono- and di-alkyl ethers derived from the polyhydric alcohols; such as, ethylene glycol monomethyl ether, ethylene glycol monobutyl ether, ethylene glycol monoethyl ether acetate, diethylene glycol monomethyl ether, and diethylene glycol monobutyl ether acetate (3) nitrogen-containing compounds such as urea, 2-pyrrolidinone, N-methyl-2-pyrrolidinone, and 1,3-dimethyl-2-imidazolidinone; and (4) sulfur-containing compounds such as 2,2'-thiodiethanol, dimethyl sulfoxide and tetramethylene sulfone. Typical aqueous-based ink compositions useful in the invention may contain 2-10 weight percent co-solvent(s).

Ink compositions of the present invention comprise at least one water-dispersible polyurethane compound. By water-dispersible it its meant to include individual polymer molecules or colloidal assemblies of polymer molecules which are stably dispersed in the ink without the need for a dispersing agent. Water dispersible polyurethanes employed in the present invention may have the general formula of (I)

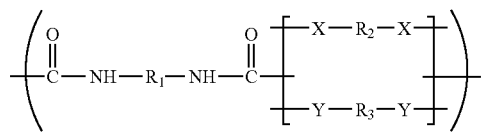
(I)

wherein $R_1$ in the structure (I) above is the central portion of the monomer unit that is the polymerization product of a diisocyanate; $R_2$ represents the central portion of a unit that is the polymerization product of at least one type of polyol or, optionally, a polyamine; $R_3$ is the central portion of a unit containing an acid group; and X and Y can be the same or different and are —O— or —N— atom.

$R_1$ is preferably a hydrocarbon group having a valence of two, more preferably containing a substituted or unsubstituted alicyclic, aliphatic, or aromatic group, preferably represented by one or more of the following structures:

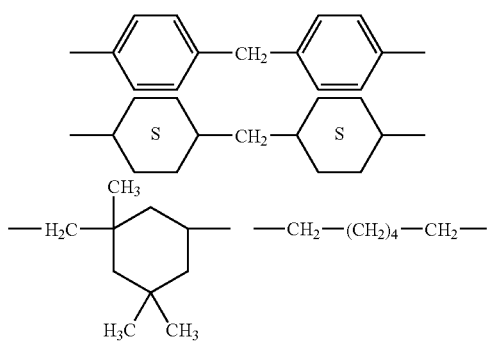

$R_2$ preferably represents a soft segment comprising a prepolymer having ester, carbonate, or ether linkages.

The soft segment is introduced into the polyurethane backbone by using the prepolymer with both ends terminated with a hydroxyl (diol) or an amino (diamine) group. The prepolymer having terminal hydroxyl groups is known as polyols, and that having terminal amine groups is known as polyamine. Polyols useful for the practice of the invention include a) a polyester polyol obtained by, for example, esterification of a dicarboxylic acid with a diol; or ring opening reaction of a lactone (e.g. ε-caprolactone) and a diol, b) a polycarbonate polyol obtained, for example, by reacting a diols with diaryl carbonates or phosgene; and, a polyether diol, c) a polyether polyol as a condensation product of, for example, ethylene glycol, propylene glycol, or tetramethylene glycol. Preferably the polyols have a molecular weight above about 300 and below about 3000. Polyamines useful for the practice of the invention include those sold tradename JEFFAMINE® D, ED, and M series from HUNTSMAN. Another more preferred polyether diamine is a polytetrahydrofuran bis(3-aminopropyl) terminated having a molecular weight of about 1,000.

$R_3$ is preferably the central portion of a monomeric unit containing a phosphoric acid, carboxylic acid or sulfonic acid group, most preferably being carboxylic acids, such as 2,2'-bishydroxymethyl)propionic acid, 2,2'-bis(hydroxymethyl) butoric acid, hydroxyethylether of 4,4'-bis(4-hydroxyphenyl) valeric acid. These materials may be prepared by any of the well known techniques in art of polyurethane manufacture, for example, processes disclosed in U.S. Pat. No. 4,335,029 Dadi, et al. assignee Witco Chemical Corporation (New York, N.Y.) and in Aqueous Polyurethane Dispersions B.K. Kim, Colloid & Polymer Science, Vol. 274, No. 7 (1996) 599-611© Steinopff Verlag 1996.

Furthermore, the polyurethane of this invention has a sufficient amount of acid groups in the molecule to have an acid number from about 60 to about 130 wherein, the acid number is defined as the milligrams of potassium hydroxide required to neutralize one gram of polymer. The acid number of the polymer may be calculated by the formula given in the following equation:

Acid number=(moles of acid monomer)*(56 grams/mole)*(1000)/(total grams of monomers), where, moles of acid monomer is the total moles of all acid group containing monomers that comprise the polymer, 56 is the formula weight for potassium hydroxide and total grams of monomers is the summation of the weight of all the monomers, m grams, comprising the target polymer.

The acid groups on the polyurethane compounds of the present invention are at least partially neutralized (converted into salts) using monovalent inorganic bases, preferably aqueous alkaline metal hydroxides, selected from; potassium hydroxide, sodium hydroxide, rubidium hydroxide or lithium hydroxide. In a preferred embodiment, at least 70 percent of the available acid groups on the polymer are converted into salts using inorganic base, more preferably at least 90% of the available acid groups are converted. Inorganic bases are highly preferred over organic bases such as amines as the neutralizing agents for the polyurethanes since inks containing polyurethanes neutralized with organic amines show very poor jetting performance in a thermal inkjet printhead.

Polyurethane dispersions useful for the practice of the invention can be prepared by preparing a prepolymer having a relatively low molecular weight and a small excess of isocyanate groups and chain-extending with a chain extender the prepolymers into a high molecular weight polyurethane during the dispersion process. Such processes have been disclosed in, for example, U.S. Pat. No. 4,335,029 by Dadi, et al. assigned to Witco Chemical Corporation (New York, N.Y.); in "Aqueous Polyurethane Dispersions" by B. K. Kim, Colloid & Polymer Science, Vol. 274, No. 7 (1996) 599-611 © Steinopff Verlag 1996; and in "Polyurethane Dispersion Process)" by Manea et al. Paint and Coating Industry, January 200, Page 30.

Preferred diamine chain extenders for the practice of the invention include ethylene diamine, diethylene triamine, propylene diamine, butylene diamine, hexamethylene diamine, cyclohexylene diamine, phenylene diamine, tolylene diamine, xylylene diamine, 3,3'-dinitrobenzidene, ethylene methylenebis(2-chloroaniline), 3,3'-dichloro-4,4'-biphenyl diamine. 2,6-diaminopyridine, 4,4'-diamino diphenylmethane, adducts of diethylene triamine with acrylate or its hydrolyzed products, hydrazine, and substituted hydrazines.

The polyurethane dispersions useful for the practice of this invention can also be prepared without involving the chain-extension step during the dispersion step. In the process the chemical reaction for forming urethane or urea linkages is completed prior to the dispersion step.

The polyurethane of this invention has a minimum molecular weight of at least 10,000. Preferably, the polyurethane has a maximum molecular weight of 150,000. More preferably, the molecular weight of polyurethane is between about 20,000 and 150,000, and most preferably between about 20,000 and 50,000. The polyurethane used in the invention is present in the inkjet ink at a minimum of about 0.7 weight percent of the total ink.

The polyurethane dispersions useful for the practice of this invention preferably have a mean particle size of less than 100 nm and more preferably less than 50 nm.

The pigment-based ink compositions of the present invention also comprise a water-soluble acrylic polymer comprising carboxylic acid groups, and the colorless ink compositions preferably also comprise a water-soluble acrylic polymer comprising carboxylic acid groups. The term "water-soluble" is meant herein that when the polymer is dissolved in water and when the polymer is at least partially neutralized with an inorganic monovalent base the resultant solution is visually clear.

The monomers for the water-soluble acrylic polymer of this invention can be selected from methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, 2-hydroxypropyl methacrylate, acrylonitrile, methacrylonitrile, vinyl acetate, vinyl propionate, vinylidene chloride, vinyl chloride, styrene, α-methyl styrene, t-butyl styrene, vinyl toluene, butadiene, isoprene, N,N-dimethyl acrylamide, acrylic acid, methacrylic acid, chloromethacrylic acid, maleic acid and derivatives thereof. Examples of suitable monomers include allyl compounds such as allyl esters (e.g., allyl acetate, allyl caproate, etc.); vinyl ethers (e.g., methyl vinyl ether, butyl vinyl ether, methoxyethyl vinyl ether, ethoxyethyl vinyl ether, chloroethyl vinyl ether, 1-methyl-2, 2-dimethylpropyl vinyl ether, hydroxyethyl vinyl ether, diethylene glycol vinyl ether, dimethylaminoethyl vinyl ether, butylaminoethyl vinyl ether, benzyl vinyl ether, tetrahydrofurfuryl vinyl ether, etc.); vinyl esters (such as vinyl acetate, vinyl propionate, vinyl butyrate, vinyl isobutyrate, vinyl dimethyl propionate, vinyl ethyl butyrate, vinyl chloroacetate, vinyl dichloroacetate, vinyl methoxyacetate, vinyl phenyl acetate, vinyl acetoacetate, etc.); vinyl heterocyclic compounds (such as N-vinyl oxazolidone, N-vinylimidazole, N-vinylpyrrolidone, N-vinylcarbazole, vinyl thiophene, N-vinylethyl acetamide, etc.); strenes (e.g, styrene, divinylbenzene, methylstyrene, dimethylstyrene, ethylstyrene, isopropylstyrene, sodium styrenesulfonate, potassium styrenesulfinate, butylstyrene, hexylstyrene, cyclohexylstyrene, benzylstyrene, chloromethylstyrene, trifluoromethylstyrene, acetoxymethylstyrene, acetoxystyrene, vinylphenol, (t-butoxycarbonyloxy)styrene, methoxystyrene, 4-methoxy-3-methylstyrene, dimethoxystyrene, chlorostyrene, dichlorostyrene, trichlorostyrene, bromostyrene, iodostyrene, fluorostyrene, methyl vinylbenzoate ester, vinylbenzoic acid, etc.); crotonic acids (such as crotonic acid, crotonic acid amide, crotonate esters (e.g., butyl crotonate, etc.)); vinyl ketones (e.g., methyl vinyl ketone, etc); olefins (e.g., dicyclopentadiene, ethylene, propylene, 1-butene, 5,5-dimethyl-1-octene, etc.); itaconic acids and esters (e.g., itaconic acid, methyl itaconate, etc.), other acids such as sorbic acid, cinnamic acid, methyl sorbate, citraconic acid, chloroacrylic acid mesaconic acid, maleic acid, fumaric acid, and ethacrylic acid; halogenated olefins (e.g., vinyl chloride, vinylidene chloride, etc.); unsaturated nitriles (e.g., acrylonitrile, etc.); acrylic or methacrylic acids and esters (such as acrylic acid, methyl acrylate, methacrylic acid, methyl methacrylate, ethyl acrylate, butyl acrylate, butyl methacrylate, 2-hydroxyethyl methacrylate, 2-acetoacetoxyethyl methacrylate, sodium-2-sulfoethyl acrylate, 2-aminoethylmethacrylate hydrochloride, glycidyl methacrylate, ethylene glycol dimethacrylate, etc.); and acrylamides and methacrylamides (such as acrylamide, methacrylamide, N-methylacrylamide, N,N-dimethylacrylamide, N-isopropylacrylamide, N-s-butylacrylamide, N-t-butylacrylamide, N-cyclohexylacrylamide, N-(3-aminopropyl)methacrylamide hydrochloride, N-(3-dimethylaminopropyl)methacrylamide hydrochloride, N,N-dipropylacrylamide, N-(1,1-dimethyl-3-oxobutyl)acrylamide, N-(1,1,2-trimethylpropyl)acrylamide, N-(1,1,3,3-tetramethylbutyl) acrylamide, N-(1-phthalamidomethyl)acrylamide, sodium N-(1,1-dimethyl-2-sulfoethyl)acrylamide, N-butylacrylamide, N-(1,1-dimethyl-3-oxobutyl)acrylamide, N-(2-carboxyethyl)acrylamide, 3-acrylamido-3-methylbutanoic acid, etc.).

The water-soluble acrylic polymer can be prepared by emulsion polymerization, solution polymerization or bulk polymerization technique well known in the art. Preferably, the water-soluble acrylic polymer has a weight average molecular weight of less than about 20,000. Preferably, the polymer has a sufficient number of acid groups such that the acid number of the polymer is greater than about 115.

The acid groups on the acrylic polymers are at least partially neutralized (converted into salts) using monovalent inorganic bases, preferably aqueous alkaline metal hydroxides, selected from; potassium hydroxide, sodium hydroxide, rubidium hydroxide or lithium hydroxide. In a preferred embodiment, at least 50 percent of the available acid groups on the polymer are converted into salts using monovalent inorganic base, more preferably at least 70% of the available acid groups are converted. From a manufacturing perspective, preferably less than 100% of the acid groups are neutralized as this can lead to lack of control of the pH of the inks. Monovalent inorganic bases are highly preferred over organic bases such as amines as the neutralizing agents for the acrylic polymers since inks containing acrylic polymers neutralized with organic amines show very poor jetting performance in a thermal inkjet printhead.

Polymers which may be employed in the present invention are exemplified by those disclosed in U.S. Pat. No. 6,866,379, which is incorporated herein in their entirety by reference. Specific examples of preferred water-soluble polymers useful in the present invention are copolymers prepared from at least one hydrophilic monomer that is an acrylic acid or methacrylic acid monomer, or combinations thereof. Preferably, the hydrophilic monomer is methacrylic acid.

Preferred water-soluble polymers useful in the present invention are copolymers prepared from at least one hydrophobic monomer that is an (meth)acrylic acid ester. Examples of hydrophobic monomers include, methyl (meth)acrylate, ethyl(meth)acrylate, butyl(meth)acrylate, octyl(meth)acrylate, decyl(meth)acrylate, lauryl(methacrylate), stearyl (meth)acrylate, benzyl(meth)acrylate, phenyl(meth)acrylate, or combinations thereof Preferred hydrophobic monomers are benzyl(meth)acrylate.

The water-soluble polymer may also be a styrene-acrylic copolymer comprising a mixture of vinyl or unsaturated monomers, including at least one styrenic monomer and at least one acrylic monomer, at least one of which monomers has an acid or acid-providing group. Such polymers are disclosed in, for example, U.S. Pat. Nos. 4,529,787; 4,358,573; 4,522,992; 4,546,160; the disclosures of which are incorporated herein by reference. Preferred polymers include, for example, styrene-acrylic acid, styrene-acrylic acid-alkyl acrylate, styrene-maleic acid, styrene-maleic acid-alkyl acrylate, styrene-methacrylic acid, styrene-methacrylic acid-alkyl acrylate, and styrene-maleic acid half ester, wherein each type of monomer may correspond to one or more particular monomers. Examples of preferred polymers include but are not limited to styrene-acrylic acid copolymer, (3-methyl styrene)-acrylic acid copolymer, styrene-methacrylic acid copolymer, styrene-butyl acrylate-acrylic acid terpolymer, styrene-butyl methacrylate-acrylic acid terpolymer, styrene-methyl methacrylate-acrylic acid terpolymer, styrene-butyl acrylate-ethyl acrylate-acrylic acid tetrapolymer and styrene-(α-methylstyrene)-butyl acrylate-acrylic acid tetrapolymer.

The water-soluble acrylic polymer is not limited in the arrangement of the monomers comprising the copolymer. The arrangement of monomers may be totally random, or they may be arranged in blocks such as AB or ABA wherein, A is the hydrophobic monomer and B is the hydrophilic monomer. In addition, the polymer make take the form of a random terpolymer or an ABC tri-block wherein, at least one of the A, B and C blocks is chosen to be the hydrophilic monomer and the remaining blocks are hydrophobic blocks dissimilar from one another.

The water-soluble acrylic polymer used in the invention is present in the pigment-based inkjet ink at a concentration of greater than 0.6 weight percent based on the total weight of the pigment based ink. In a preferred embodiment of the present invention the ink composition comprises a polyurethane described above and a water-soluble polymer described above wherein, the ratio of total amount of polyurethane and acrylic polymer(s) to pigment is between 0.5 and 1.5 and the ratio of polyurethane polymer to acrylic polymer is between 0.5 and 2. In the case of a colorless ink the acrylic polymer is optional.

In another preferred embodiment, the components of the ink composition are selected such that the ink viscosity is less than about 3.5 centapoise at 25 degrees Celsius, more preferably less Man about 3.0, even more preferably less than 2.5 and most preferably less than 2.0. Ink compositions defined by these preferred embodiments are capable of achieving high firing frequencies with low variability for a large number of firing events.

Surfactants may be added to adjust the surface tension of the ink to an appropriate level. In a particular embodiment, relative dynamic and static surface tensions of various pigment based inks and colorless protective ink of an ink set may be controlled as described in copending, commonly assigned US Publication No. 2008/0207805 (based on Provisional Application Ser. No. 60/892,176 filed Feb. 28, 2007), the disclosure of which is incorporated by reference herein, to control intercolor bleed between the inks. The surfactants may be anionic, cationic, amphoteric or nonionic and used at levels of 0.01 to 5% of the ink composition. Examples of suitable nonionic surfactants include, linear or secondary alcohol ethoxylates (such as the Tergitol® 15-S and Tergitol® TMN series available from Union Carbide and the Brij® series from Uniquema), ethoxylated alkyl phenols (such as the Triton® series from Union Carbide), fluoro surfactants (such as the Zonyls® from DuPont; and the Fluorads® from 3M), fatty acid ethoxylates, fatty amide ethoxylates, ethoxylated and propoxylated block copolymers (such as the Pluronia and Tetronic® series from BASF, ethoxylated and propoxylated silicone based surfactants (such as the Silwet® series from CK Witco), alkyl polyglycosides (such as the Glucopons® from Cognis) and acetylenic polyethylene oxide surfactants (such as the Surfynols from Air Products).

Examples of anionic surfactants include; carboxylated (such as ether carboxylates and sulfosuccinates), sulfated (such as sodium dodecyl sulfate), sulfonated (such as dodecyl benzene sulfonate, alpha olefin sulfonates, alkyl diphenyl oxide disulfonates, fatty acid taurates and alkyl naphthalene sulfonates), phosphated (such as phosphated esters of alkyl and aryl alcohols, including the Strodex® series from Dexter Chemical), phosphonated and amine oxide surfactants and anionic fluorinated surfactants. Examples of amphoteric surfactants include; betaines, sultaines, and aminopropionates. Examples of cationic surfactants include; quaternary ammonium compounds, cationic amine oxides, ethoxylated fatty amines and imidazoline surfactants. Additional examples are of the above surfactants are described in "McCutcheon's Emulsifiers and Detergents: 1995, North American Editor".

A biocide (0.01-1.0% by weight) may also be added to prevent unwanted microbial growth which may occur in the ink over time. A preferred biocide for the inks employed in the present invention is Proxel® GXL (Zeneca Colours Co.) at a concentration of 0.05-0.1% by weight or/and Kordek® (Rohm and Haas Co.) at a concentration of 0.05-0.1% by weight (based on 100% active ingredient. Additional additives which may optionally be present in an inkjet ink composition include thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers and defoamers.

The pH of the aqueous ink compositions of the invention may be adjusted by the addition of organic or inorganic acids or bases. Inorganic bases are preferred, however small amounts of organic bases, such as triethanolamine, may be used to adjust the pH of the ink. Useful inks may have a preferred pH of from about 4 to 10, depending upon the type of pigment being used. Preferably, the pH of the present ink is from 6 to 9, more preferably from 7.5 to 8.5.

The inks of the present invention can be printed through an inkjet printhead capable of achieving firing frequencies of at least 12 kHz with a near nozzle velocity of at least 10 meters/second. Any of the known printhead designs in the art of inkjet printing may be used which are capable of achieving these high speed firing frequencies. Preferably, the IJ printer is equipped with a thermal inkjet printhead. Particularly preferred printhead designs are disclosed in US Publication No. 2006/0103691 and commonly assigned, copending Publication No. 2008/0136867, the disclosures of which are incorporated by reference herein.

Inks of the present invention may be applied to a photoglossy or plain paper receiver. The two types of receivers are distinguished from one another in that the photoglossy receiver is manufactured with a coated layer above the underlying paper support. Examples of plain papers include; Kodak bright white inkjet paper, Hewlett Packard Color inkjet paper, Xerox Extra Bright white inkjet paper, Georgia-Pacific inkjet Paper Catalog Number 999013, Staples inkjet paper International Paper Great White MultiUse 20 Paper, Xerox Premium Multipurpose Paper, Hammermill Copy plus or ForeMP paper, and Hewlett Packard Multipurpose paper. The plain papers may include papers that have been treated with multivalent salts during or after manufacture of the paper.

Inks of the present invention can be printed as digital images having photographic quality if a suitable recording medium, such as glossy inkjet paper, is used. Photoglossy receivers may be further categorized as being a swellable media (having a non-porous polymer coating) or a microporous media, although hybrid designs are also well known. The microporous media are typically comprised of water-absorbing fine particles or powders mixed with a polymeric hydrophilic binder to form a microporous structured coating. The hydrophilic particles or powders are typically polycrystalline inorganic materials such as boehmite alumina or amorphous inorganic materials such as aluminum silicates. Microporous photoglossy media are preferred due to their relatively quick drying capabilities and improved water-fastness and smudge resistance compared to swellable media. The design of the both plain paper and photoglossy media vary widely depending on materials and paper manufacturing processes and should not be construed to limit the scope of the present invention.

The following examples illustrate, but do not limit, the utility of the present invention.

EXAMPLES

Acrylic Polymers Used in the Ink Examples

Acrylic Polymer AC-1: A copolymer of benzylmethacrylate and methacrylic acid having an acid number of about 135 as determined by titration method, a weight average molecular weight of about 7160 and number average molecular weight of 4320 as determined by the Size Exclusion Chromatography. The polymer is neutralized with potassium hydroxide to have a degree of neutralization of about 85%.

Acrylic Polymer AC-2: A copolymer of benzylmethacrylate and methacrylic acid having an acid number of about 215, a weight average molecular weight of about 8000 and number average molecular weight of about 5000. The polymer is neutralized with potassium hydroxide to have a degree of neutralization of about 70%

Acrylic Polymer AC-3: TruDot™ IJ-4655, an acrylic copolymer commercially available from Westvaco Corp., and having an acid number of about 230. The polymer is neutralized with potassium hydroxide to have a degree of neutralization of about 95%.

Acrylic Polymer AC4: SMA17352® a styrene maleic anhydride copolymer commercially available from SARTOMER COMPANY INC and having an acid number of about 270. The polymer is neutralized with potassium hydroxide to have a degree of neutralization of about 85%.

Polyurethane Dispersions Used in the Ink Examples

Polyurethane dispersions shown in the ink examples below typically have particle sizes in the range from about 10 to about 40 nanometers in diameter. These sizes may change depending on the specific aqueous environment of the ink formulations. Unless otherwise stated, the polyurethanes dispersions are prepared by carrying out the polymerization reaction in tetrahydrofuran (THF) using isophorone diisocyante, 2,2-bis(hydroxymethyl)propionic acid, and a polyol, neutralizing the resultant polymer with aqueous potassium hydroxide solution, diluting with additional deionized water if necessary, and removing THF by vacuum distillation.

Polyurethane PU-1: An 85 acid number polyurethane made with isophorone diisocyanate and a 2000 Mw polytetrahydrofuran polyol where 100%, of the acid groups are neutralized with potassium hydroxide.

Polyurethane PU-2: An 85 acid number polyurethane made with isophorone diisocyanate and a 2000 Mw polytetrahydrofuran polyol where 90% of the acid groups are neutralized with potassium hydroxide.

Polyurethane PU-3: An 85 acid number polyurethane made with isophorone diisocyanate and a 2000 Mw polytetrahydrofuran polyol where 90% of the acid groups are neutralized with ammonium hydroxide.

Polyurethane PU-4: An 85 acid number polyurethane made with isophorone diisocyanate and a 2000 Mw polytetrahydrofuran polyol where 45% of the acid groups are neutralized with ammonium hydroxide and an additional 45% are neutralized with potassium hydroxide.

Polyurethane PU-5: An 85 acid number polyurethane made with isophorone diisocyanate and a 2000 Mw polytetrahydrofuran polyol where 90% of the acid groups are neutralized with lithium hydroxide.

Polyurethane PU-6: An 85 acid number polyurethane made with isophorone diisocyanate and a 2000 Mw polytetrahydrofuran polyol where 90% of the acid groups are neutralized with Rubidium hydroxide.

Polyurethane PU-7: An 85 acid number polyurethane made with isophorone diisocyanate and a 2000 Mw polytetrahydrofuran polyol where 100% of the acid groups are neutralized with triethanolamine.

Polyurethane PU-8: An 85 acid number polyurethane made with isophorone diisocyanate and a 2000 Mw polytetrahydrofuran polyol where 85% of the acid groups are neutralized with potassium hydroxide.

Polyurethane PU-12: An 80 acid number polyurethane made with isophorone diisocyanate and a combination of butanediol and diethylene glycol in a 1.74:1 ratio where 100% of the acid groups are neutralized with potassium hydroxide. PU-12 was prepared according to the following procedure:

In a 2-liter 3-neck round bottom flask equipped with a thermometer, stirrer, water condenser, and a vacuum outlet, the following materials were added at 40° C. while stirring: 100.00 g 2-butanone, 32.46 g (0.242 moles) 2,2-bis(hydroxymethyl)proprionic acid, 14.78 g (0.164 moles) of 1,4-butanediol, 10.00 g (0.094 moles) di(ethylene glycol), and 20 drops of dibutyltin dilaurate (catalyst). The temperature was adjusted to 70° C., and when a homogeneous solution was obtained, 112.2 g (0.500 moles) isophorone diisocyanate and 10.0 g 2-butanone were added. The temperature was adjusted to 80° C. and maintained for about 16 hours to complete the reaction.

The mixture was diluted with acetone and neutralized with 13.58 g potassium hydroxide pellets. 600 g of distilled water was added to the neutralized mixture under high shear to form a stable aqueous solution followed by evaporation under vacuum to remove organic solvents. The final solution was 29.02% solids.

Polyurethane PU-13: An 85 acid number polyurethane made with isophorone diisocyanate and a 2900 Mw polytetrahydrofuran polyol where 100% of the acid groups are neutralized with potassium hydroxide. The overall Mw is 42500.

Polyurethane PU-14: An 85 acid number polyurethane made with isophorone diisocyanate and a 2000 Mw polytetrahydrofuran polyol where 100% of the acid groups are neutralized with potassium hydroxide. The overall Mw is 40500.

Polyurethane PU-15: An 85 acid number polyurethane made with isophorone diisocyanate and a 2000 Mw polytetrahydrofuran polyol where 85% of the acid groups are neutralized with potassium hydroxide. The overall Mw is 27100.

Polyurethane PU-16: An 85 acid number polyurethane made with isophorone diisocyanate and a 1400 Mw polytetrahydrofuran polyol where 85% of the acid groups are neutralized with potassium hydroxide. The overall Mw is 22200.

Polyurethane PU-17: An 85 acid number polyurethane made with isophorone diisocyanate and a 650 Mw polytetrahydrofuran polyol where 85% of the acid groups are neutralized with potassium hydroxide. The overall Mw is 20500.

Polyurethane PU-18: An 85 acid number polyurethane made with isophorone diisocyanate and a 250 Mw polytetrahydrofuran polyol where 85% of the acid groups are neutralized with potassium hydroxide. The overall Mw is 18500.

Polyurethane PU-19: An 85 acid number polyurethane made with isophorone diisocyanate and a 650 Mw polytetrahydrofuran polyol where 85% of the acid groups are neutralized with potassium hydroxide. The overall Mw is 16200.

Polyurethane PU-20: An 85 acid number polyurethane made with isophorone diisocyanate and a 250 Mw polytetrahydrofuran polyol where 85% of the acid groups are neutralized with potassium hydroxide. The overall Mw is 25300.

Polyurethane PU-50: A 76 acid number polyurethane with a weight average molecular weight of 26,100 made with isophorone diisocyanate and a combination of poly(hexamethylene carbonate)diol and 2,2-bis(hydroxymethyl)proprionic acid where 100% of the acid groups are neutralized with potassium hydroxide.

Polyurethane PU-51: A 76 acid number polyurethane with a weight average molecular weight of 13,300 made with isophorone diisocyanate and a combination of poly(hexamethylene carbonate)diol and 2,2-bis(hydroxymethyl)proprionic acid where 100% of the acid groups are neutralized with potassium hydroxide.

Polyurethane PU-54: A 100 acid number polyurethane with a weight average molecular weight of 22,600 made with isophorone diisocyanate and a combination of poly(hexamethylene carbonate)diol and 2,2-bis(hydroxymethyl)proprionic acid where 100% of the acid groups are neutralized with potassium hydroxide.

Polyurethane PU-55: A 135 acid number polyurethane with a weight average molecular weight of 11,800 made with isophorone diisocyanate and a combination of poly(hexamethylene carbonate)diol and 2,2-bis(hydroxymethyl)proprionic acid where 100% of the acid groups are neutralized with potassium hydroxide.

Polyurethane PU-56: A 59 acid number polyurethane with a weight average molecular weight of 25,310 made with isophorone diisocyanate and a combination of poly(hexamethylene carbonate)diol and 2,2-bis(hydroxymethyl)proprionic acid where 100% of the acid groups are neutralized with potassium hydroxide.

Polyurethane PU-57: A 70 acid number polyurethane with a weight average molecular weight of 23,496 made with isophorone diisocyanate and a combination of poly(hexamethylene carbonate)diol and 2,2-bis(hydroxymethyl)proprionic acid where 100% of the acid groups are neutralized with potassium hydroxide.

Polyurethane PU-58: A 100 acid number polyurethane with a weight average molecular weight of 14,100 made with isophorone diisocyanate and a combination of poly(hexamethylene carbonate)diol and 2,2-bis(hydroxymethyl)proprionic acid where 100% of the acid groups are neutralized with potassium hydroxide.

Polyurethane PU-59: A 110 acid number polyurethane with a weight average molecular weight of 27,600 made with isophorone diisocyanate and a combination of poly(hexamethylene carbonate)diol and 2,2-bis(hydroxymethyl)proprionic acid where 100% of the acid groups are neutralized with potassium hydroxide.

Typical Preparation of Pigment Dispersions

Cyan Pigment Dispersion C-1:

A mixture of Pigment Blue 15:3, potassium salt of oleylmethyl taurate (KOMT) and deionized water were charged into a mixing vessel along with polymeric beads having mean diameter of 50 μM, such that the concentration of pigment was 20% and KOMT was 25% by weight based on pigment. The mixture was milled with a dispersing blade for over 20 hours and allowed to stand to remove air. Milling media were removed by filtration and the resulting pigment dispersion was diluted to approximately 10% pigment with deionized water to obtain cyan pigment dispersion C-1.

Yellow Pigment Dispersion Y-1:

The process used for cyan pigment dispersion C-1 was used except Pigment Yellow 155 was used in place of Pigment Blue 15:3.

Ink Preparation

Ink Example 1

A pigment blue 15:3 cyan pigment based inkjet ink formulation containing a polyurethane binder where 100% of the available acid groups in the polyurethane are neutralized with potassium hydroxide (PU-1).

Into an approximately 150 ml high density polyethylene bottle with magnetic stirring, the following components were added in order: 70.84 g of high purity water, 0.26 g of a 9.5 wt % solution of the biocide Kordek MLX, 5.63 g of ethylene glycol, 9.38 g of glycerol, 0.94 g of the nonionic surfactant Surfynol 465, 5.87 g of a 25.54 wt % solution of polyurethane PU-1, 4.55 g of a 25.0 wt % solution of acrylic polymer AC-1, and 27.58 g of a cyan pigment dispersion C-1 containing 9.98 wt % pigment PB15:3. The resulting 125 g of ink were stirred for at least an hour and filtered with a 1.0 um disk filter. The particle size distribution of pigment particles in this ink was such that the median particle size was 38.5 nm and 95% of the particles had a diameter less than 82.9 nm.

Ink Example 2

A pigment blue 15:3 cyan pigment based inkjet ink formulation containing a polyurethane binder where 90% of the available acid gloups in the polyurethane are neutralized with potassium hydroxide (PU-2).

Into an approximately 150 ml high density polyethylene bottle with magnetic stirring, the following components were added in order: 71.99 g of high purity water, 0.26 g of a 9.5 wt % solution of the biocide Kordek MLX, 5.63 g of ethylene glycol, 9.38 g of glycerol, 0.94 g of the nonionic surfactant Surfynol 465, 4.72 g of a 31.76 wt % solution of polyurethane PU-2, 4.55 g of a 25.0 wt % solution of acrylic polymer AC-1, and 27.58 g of a cyan pigment dispersion C-1 containing 9.98 wt % pigment PB15:3. The resulting 125 g of ink were stirred for at least an hour and filtered with a 1.0 um disk filter. The particle size distribution of pigment particles in this ink was such that the median particle size was 45.9 nm and 95% of the particles had a diameter less than 86.9 nm.

Ink Example 3

A pigment blue 15:3 cyan pigment based inkjet ink formulation containing a polyurethane binder where 90% of the available acid groups in the polyurethane are neutralized with ammonium hydroxide (PU-3).

Into an approximately 150 ml high density polyethylene bottle with magnetic stirring, the following components were added in order: 70.80 g of high purity water, 0.26 g of a 9.5 wt % solution of the biocide Kordek MLX, 5.63 g of ethylene glycol, 9.38 g of glycerol, 0.94 g of the nonionic surfactant Surfynol 465, 5.92 g of a 25.34 wt % solution of polyurethane PU-3, 4.55 g of a 25.0 wt % solution of acrylic polymer AC-1, and 27.58 g of a cyan pigment dispersion C-1 containing 9.98 wt % pigment PB15:3. The resulting 125 g of ink were stirred for at least an hour and filtered with a 1.0 um disk filter.

Ink Example 4

A pigment blue 15:3 cyan pigment based inkjet ink formulation containing a polyurethane binder where 45% of the available acid groups in the polyurethane are neutralized with ammonium hydroxide and 45% are neutralized with potassium hydroxide (PU-4).

Into an approximately 150 ml high density polyethylene bottle with magnetic stirring, the following components were added in order: 7.07 g of high purity water, 0.26 g of a 9.5 wt % solution of the biocide Kordek MLX 5.63 g of ethylene glycol, 9.38 g of glycerol, 0.94 g of the nonionic surfactant Surfynol 465, 5.64 g of a 26.58 wt % solution of polyurethane PU-4, 4.55 g of a 25.0 wt % solution of acrylic polymer AC-1, and 27.58 g of a cyan pigment dispersion C-1 containing 9.98 wt % pigment PB15:3. The resulting 125 g of ink were stirred for at least an hour and filtered with a 1.0 um disk filter.

Ink Example 5

A PB15:3 cyan pigment based inkjet ink formulation containing a polyurethane binder where 90% of the available acid groups in the polyurethane are neutralized with lithium hydroxide (PU-5).

Into an approximately 150 ml high density polyethylene bottle with magnetic stirring, the following components were added in order: 71.18 g of high purity water, 0.26 g of a 9.5 wt % solution of the biocide Kordek MLX, 5.63 g of ethylene glycol, 9.38 g of glycerol, 0.94 g of the nonionic surfactant Surfynol 465, 5.54 g of a 27.07 wt % solution of polyurethane PU-5, 4.55 g of a 25.0 wt % solution of acrylic polymer AC-1, and 27.58 g of a cyan pigment dispersion C-1 containing 9.98 wt % pigment PB15:3. The resulting 125 g of ink were stirred for at least an hour and filtered with a 1.0 um disk filter.

Ink Example 6

A pigment blue 15:3 cyan pigment based inkjet ink formulation containing a polyurethane binder where 90% of the available acid groups in the polyurethane are neutralized with rubidium hydroxide (PU-6).

Into an approximately 150 ml high density polyethylene bottle with magnetic stirring, the following components were added in order: 71.61 g of high purity water, 0.26 g of a 9.5 wt % solution of the biocide Kordek MLX, 5.63 g of ethylene glycol, 9.38 g of glycerol, 0.94 g of the nonionic surfactant Surfynol 465, 5.10 g of a 29.39 wt % solution of polyurethane PU-6, 4.55 g of a 25.0 wt % solution of acrylic polymer AC-1, and 27.58 g of a cyan pigment dispersion C-1 containing 9.98 wt % pigment PB15:3. The resulting 125 g of ink were stirred for at least an hour and filtered with a 1.0 um disk filter.

Ink Example 7

A pigment blue 15:3 cyan pigment based inkjet ink formulation containing a polyurethane binder where 100% of the available acid groups in the polyurethane are neutralized with triethanolamine (PU-7).

Into an approximately 150 ml high density polyethylene bottle with magnetic stirring, the following components were added in order: 72.14 g of high purity water, 0.26 g of a 9.5 wt % solution of the biocide Kordek MLX, 5.63 g of ethylene glycol, 9.38 g of glycerol, 0.94 g of the nonionic surfactant Surfynol 465, 4.74 g of a 31.62 wt % solution of polyurethane PU-7, 4.69 g of a 24.0 wt % solution of acrylic polymer AC-2, and 27.23 g of a cyan pigment dispersion C-1 containing 10.10 wt % pigment PB15:3. The resulting 125 g of ink were stirred for at least an hour and filtered with a 1.0 um disk filter.

Ink Example 8

A pigment blue 15:3 cyan pigment based inkjet ink formulation containing a polyurethane binder where 85% of the available acid groups in the polyurethane are neutralized with potassium hydroxide (PU-8).

Into an approximately 150 ml high density polyethylene bottle with magnetic stirring, the following components were added in order: 71.88 g of high purity water, 0.26 g of a 9.5 wt % solution of the biocide Kordek MLX, 5.63 g of ethylene glycol, 9.38 g of glycerol, 0.94 g of the nonionic surfactant: Surfynol 465, 5.01 g of a 29.97 wt % solution of polyurethane PU-8, 4.69 g of a 24.0 wt % solution of acrylic polymer AC-2, and 27.23 g of a cyan pigment dispersion C-1 containing 10.10 wt % pigment PB15:3. The resulting 125 g of ink were stirred for at least an hour and filtered with a 1.0 um disk filter.

Ink Example 12

A pigment blue 15:3 cyan pigment based inkjet ink formulation containing polyurethane polymer PU-12 along with the acrylic polymer AC-2.

Into an approximately 150 ml high density polyethylene bottle with magnetic stirring, the following components were added in order: 71.72 g of high purity water, 0.26 g of a 9.5 wt % solution of the biocide Kordek MLX, 5.63 g of ethylene glycol, 9.38 g of glycerol, 0.94 g of the nonionic surfactant Surfynol 465, 5.17 g of a 29.02 wt % solution of polyurethane PU-12, 4.69 g of a 24.0 wt % solution of acrylic polymer AC-2, and 27.23 g of a cyan pigment dispersion C-1 containing 10.10 wt % pigment PB15:3. The resulting 125 g of ink were stirred for at least an hour and filtered with a 1.0 um disk filter.

Ink Example 13

A pigment blue 15:3 cyan pigment based inkjet ink formulation containing polyurethane polymer PU-13 along with the acrylic polymer AC-1.

Into an approximately 150 ml high density polyethylene bottle with magnetic stirring, the following components were added in order: 72.46 g of high purity water, 0.26 g of a 9.5 wt % solution of the biocide Kordek MLX, 5.63 g of ethylene glycol, 9.38 g of glycerol, 0.94 g of the nonionic surfactant Surfynol 465, 4.61 g of a 32.53 wt % solution of polyurethane PU-13, 4.50 g of a 25.0 wt % solution of acrylic polymer AC-1, and 27.23 g of a cyan pigment dispersion C-1 containing 10.10 wt % pigment PB15:3. The resulting 125 g of ink were stirred for at least an hour and filtered with a 1.0 um disk filter.

Ink Example 14

A pigment blue 15:3 cyan pigment based inkjet ink formulation containing polyurethane polymer PU-14 along with the acrylic polymer AC-1.

This ink was prepared identically to ink example 13 except that 5.42 g of a 27.66 wt % solution of polyurethane PU-14 was substituted for polyurethane PU-13 and the water addition was adjusted to compensate for the different polymer solution concentration.

Ink Example 15

A pigment blue 15:3 cyan pigment based inkjet ink formulation containing polyurethane polymer PU-15 along with the acrylic polymer AC-1.

This ink was prepared identically to ink example 13 except that 5.66 g of a 32.19 wt % solution of polyurethane PU-15 was substituted for polyurethane PU-13 and the water addition was adjusted to compensate for the different polymer solution concentration.

Ink Example 16

A pigment blue 15:3 cyan pigment based inkjet ink formulation containing polyurethane polymer PU-16 along with the acrylic polymer AC-1.

This ink was prepared identically to ink example 13 except at double the final total ink weight to 250 g so that 10.74 g of a 27.92-wt % solution of polyurethane PU-16 was substituted for polyurethane PU-13 and the water addition was adjusted to compensate for the different polymer solution concentration.

Ink Example 17

A pigment blue 15:3 cyan pigment based inkjet ink formulation containing polyurethane polymer PU-17 along with the acrylic polymer AC-1.

This ink was prepared identically to ink example 13 except at double the final total ink weight to 250 g so that 10.23 g of a 29.32-wt % solution of polyurethane PU-17 was substituted for polyurethane PU-13 and the water addition was adjusted to compensate for the different polymer solution concentration.

Ink Example 18

A pigment blue 15:3 cyan pigment based inkjet ink formulation containing polyurethane polymer PU-18 along with the acrylic polymer AC-1.

This ink was prepared identically to ink example 13 except at double the final total ink weight to 250 g so that 11.99 g of a 25.03-wt % solution of polyurethane PU-18 was substituted for polyurethane PU-13 and the water addition was adjusted to compensate for the different polymer solution concentration.

Ink Example 19

A pigment blue 15:3 cyan pigment based inkjet ink formulation containing polyurethane polymer PU-19 along with the acrylic polymer AC-1.

This ink was prepared identically to ink example 13 except that 6.24 g of a 24.02 wt % solution of polyurethane PU-19 was substituted for polyurethane PU-13 and the water addition was adjusted to compensate for the different polymer solution concentration.

Ink Example 20

A pigment blue 15:3 cyan pigment based inkjet ink formulation containing polyurethane polymer PU-20 along with the acrylic polymer AC-1.

This ink was prepared identically to ink example 13 except that 5.42 g of a 27.70 wt % solution of polyurethane PU-20 was substituted for polyurethane PU-13 and the water addition was adjusted to compensate for the different polymer solution concentration.

Ink Example 51

A colorless ink formulation employing a polycarbonate-type polyurethane and TruDot™ acrylic polymers with Dowanol DB and DEG as humectants.

Into an approximately 150 ml high density polyethylene bottle with magnetic stirring, the following components were added in order: 88.78 g of high purity water, 0.26 g of a 9.5 wt % solution of the biocide Kordek MLX, 12.5 g of diethylene glycol, 3.13 g of Dowanol DB, 0.63 g of the surfactant Sillwt L-77, 15.24 g of a 24.6 wt % solution of polyurethane PU-50, 4.46 g and 28.0 wt % solution of acrylic polymer AC-3. The resulting 125 g of ink were stirred for at least an hour and filtered with a 1.0 um disk filter.

Ink Example 52

A colorless ink formulation employing a polycarbonate-type polyurethane and TruDot™ acrylic polymers with Dowanol DB and DEG as humectants.

This ink was prepared identically to ink example 51 except that 15.0 g of a 25.0-wt % solution of polyurethane PU-51 was substituted for polyurethane PU-50 and the water addition was adjusted to compensate for the different polymer solution concentration.

Ink Example 53

A colorless ink formulation employing a polycarbonate-type polyurethane and a 67/33 wt % ratio benzylmethacrylate methacrylic acid copolymer with Dowanol DB and DEG as humectants.

This ink was prepared identically to ink example 51 except that 5.21 g of a 24.0-wt % solution of AC-2 was substituted for AC-3 and the water addition was adjusted to compensate for the different polymer solution concentration.

Ink Example 54

A yellow pigment, Pigment yellow155 ink formulation employing a polycarbonate-type polyurethane and TruDot™ acrylic polymers with Dowanol DB and DEG as humectants.

Into an approximately 150 ml high density polyethylene bottle with magnetic sting, the following components were added in order: 58.48 g of high purity water, 0.26 g of a 9.5 wt % solution of the biocide Kordek MLX, 12.5 g of diethylene glycol, 3.13 g of Dowanol DB, 0.63 g of the surfactant Sillwt L-77, 8.13 g of a 24.6 wt % solution of polyurethane PU-50, 6.70 g of 28.0 wt % solution of acrylic polymer AC-3, and 35.18 g of yellow pigment dispersion PY-1 containing 9.77 wt-% yellow pigment PY155. The resulting 125 g of ink were stirred for at least an hour and filtered with a 1.0 um disk filter. The particle size distribution of pigment particles in this ink was such that the median particle size was 9.5 nm and 95% of the particles had a diameter less than 53.5 nm.

Ink Example 55

A pigment yellow 155 ink formulation employing a polycarbonate-type polyurethane and TruDot™ acrylic polymers with Dowanol DB and DEG as humectants.

This ink was prepared identically to ink example 54 except that 8.0 g of a 25.0-wt % solution of polyurethane PU-51 was substituted for polyurethane PU-50 and the water addition was adjusted to compensate for the different polymer solution concentration. The particle size distribution of pigment particles in this ink was such that the median particle size was 9.5 nm and 95% of the particles had a diameter less thin 52.5 nm.

Ink Example 56

A pigment yellow 155 ink formulation employing a polycarbonate-type polyurethane and a 67/33 wt % ratio benzylmethacrylate methacrylic acid copolymer with Dowanol DB and DEG as humectants.

This ink was prepared identically to ink example 51 except that 7.81 g of a 24.0-wt % solution of AC-2 was substituted for AC-3 and the water addition was adjusted to compensate for the different polymer solution concentration. The particle size distribution of pigment particles in this ink was such that the median particle size was 9.4 nm and 95% of the particles had a diameter less than 50.8 nm.

Ink Example 57

A colorless ink formulation employing a polycarbonate-type polyurethane and a 77.5/22.5 wt % ratio benzylmethacrylate methacrylic acid copolymer with glycerol and ethylene glycol as humectants.

Ink Example 57B

A colorless ink formulation employing a polycarbonate-type polyurethane and a 67.5/33 wt % ratio benzylmethacrylate methacrylic acid copolymer with glycerol and ethylene glycol as humectants.

Ink Example 58

A pigment yellow 155 ink formulation employing a polycarbonate-type polyurethane and a 77.5/22.5 wt % ratio benzylmethacrylate methacrylic acid copolymer with glycerol and ethylene glycol as humectants.

Ink Example 58B

A pigment yellow 155 ink formulation employing a polycarbonate-type polyurethane and a 67/33 wt % ratio benzylmethacrylate methacrylic acid copolymer with glycerol and ethylene glycol as humectants.

Ink Example 59

A pigment blue 15:3 cyan ink formulation employing a polycarbonate-type polyurethane 0.7 wt % and a 77.5/22.5 wt % ratio benzylmethacrylate methacrylic acid copolymer at 0.6 wt % with glycerol and ethylene glycol as humectants.

Into an approximately 150 ml high density polyethylene bottle with magnetic stirring, the following components were added in order: 74.65 g of high purity water, 0.26 g of a 9.5 wt % solution of the biocide Kordek MLX, 5.63 g of ethylene glycol, 9.38 g of glycerol 0.94 g of the surfactant Surfynol 465, 3.56 g of a 24.6 wt % solution of polyurethane PU-50, 3.01 g of 24.9.0 wt % solution of acrylic polymer AC-1, and 27.58 g of cyan pigment dispersion PC-1 containing 9.97 wt-% cyan pigment PB15:3. The resulting 125 g of ink were stirred for at least an hour and filtered with a 1.0 um disk filter.

Ink Example 60

A pigment blue 15:3 cyan ink formulation employing a polycarbonate-type polyurethane 0.7 wt % and a 67/33 wt % ratio benzylmethacrylate methacrylic acid copolymer at 0.6 wt % with glycerol and ethylene glycol as humectants.

This ink was prepared identically to ink example 59 except that 3.0 g of a 25.0-wt % solution of acrylic polymer AC-2 was substituted for acrylic polymer AC-1 and the water addition was adjusted to compensate for the different polymer solution concentration.

Ink Example 61

A pigment blue 15:3 cyan ink formulation employing a polycarbonate-type polyurethane 1.2 wt % and a 77.5/22.5 wt % ratio benzylmethacrylate methacrylic acid copolymer at 0.9 wt % with glycerol and ethylene glycol as humectants.

This ink was prepared identically to ink example 59 except that the polyurethane PU-50 was increased to 6.10 g of a 24.6-wt % solution and the acrylic polymer AC-1 was increased to 4.52 g of 24.9-wt % solution. Water addition was adjusted to compensate for the different amount of polymer solution added. The particle size distribution of pigment particles in this ink was such that the median particle size was 38.9 nm and 95% of the particles had a diameter less than 82.6 nm.

Ink Example 62

A pigment blue 15:3 cyan ink formulation employing a polycarbonate-type polyurethane 1.2 wt % and a 67/33 wt % ratio benzylmethacrylate methacrylic acid copolymer at 0.9 wt % with glycerol and ethylene glycol as humectants.

This ink was prepared identically to ink example 61 except that 4.50 g of a 25-wt % solution of acrylic polymer AC-2 was substituted for the acrylic polymer AC-1 and water addition was adjusted to compensate for the different amount of polymer solution added. The particle size distribution of pigment particles in this ink was such that the median particle size less 40.5 nm and 95% of the particles had a diameter less than 81.6 nm.

Ink Example 63

A pigment blue 15:3 cyan ink formulation employing a polycarbonate-type polyurethane 1.2 wt % and a 270 acid number stprene maleic anhydride copolymer Sartomer™ SMA17352 at 0.9 wt % with glycerol and ethylene glycol as humectants.

This ink was prepared identically to ink example 61 except that 4.57 g of a 24.6-wt % solution of acrylic polymer AC-4 was substituted for the acrylic polymer AC-1 and water addition was adjusted to compensate for the different amount of polymer solution added.

Ink Example 82

A pigment blue 15:3 cyan ink formulation employing a polycarbonate-type polyurethane 1.2 wt % and a 77.5/22.5 wt % ratio benzylmethacrylate methacrylic acid copolymer at 0.9 wt % with glycerol and ethylene glycol as humectants.

Into an approximately 250 ml high density polyethylene bottle with magnetic stirring, the following components were added in order: 141.40 g of high purity water, 0.53 g of a 9.5 wt % solution of the biocide Kordek MLX, 11.25 g of ethylene glycol, 18.75 g of glycerol, 1.88 g of the surfactant Surfynol 465, 12.00 g of a 25.0 wt % solution of polyurethane PU-56, 9.04 g of 24.9.0 wt % solution of acrylic polymer AC-1, and 55.17 g of cyan pigment dispersion PC-1 containing 9.97 wt-% cyan pigment PB15:3. The resulting 250 g of ink were stired for at least an hour and filtered with a 1.0 um disk filter.

Ink Example 84

A pigment blue 15:3 cyan ink formulation employing a 70 acid number polycarbonate-type polyurethane 1.2 wt % and a 77.5/22.5 wt % ratio benzylmethacrylate methacrylic acid copolymer at 0.9 wt % with glycerol and ethylene glycol as humectants.

This ink was prepared identically to ink example 82 except that 12.0 g of a 25.0-wt % solution of polyurethane PU-57 was substituted for the polyurethane PU-56.

Ink Example 86

A pigment blue 15:3 cyan ink formulation employing a 76 acid number polycarbonate-type polyurethane 1.2 wt % and a 77.5/22.5 wt % ratio benzylmethacrylate methacrylic acid copolymer at 0.9 wt % with glycerol and ethylene glycol as humectants.

This ink was prepared identically to ink example 82 except that 12.2 g of a 24.6-wt % solution of polyurethane PU-50 was substituted for the polyurethane PU-56.

Ink Example 88

A pigment blue 15:3 cyan ink formulation employing a 100 acid number polycarbonate-type polyurethane 1.2 wt % and a 77.5/22.5 wt % ratio benzylmethacrylate methacrylic acid copolymer at 0.9 wt % with glycerol and ethylene glycol as humectants.

This ink was prepared identically to ink example 82 except that 11.76 g of a 25.5-wt % solution of polyuretane PU-54 was substitulted for the polyurethane PU-56.

Ink Example 90

A pigment blue 15:3 cyan ink formulation employing a 100 acid number polycarbonate-type polyurethane 1.2 wt % and a 77.5/22.5 wt % ratio benzylmethacrylate methacrylic acid copolymer at 0.9 wt % with glycerol and ethylene glycol as humectants.

This ink was prepared identically to ink example 82 except that 11.32 g of a 26.5-wt % solution of polyurethane PU-58 was substituted for the polyurethane PU-56.

Ink Example 92

A pigment blue 15:3 cyan ink formulation employing a 110 acid number polycarbonate-type polyurethane 1.2 wt % and a 77.5/22.5 wt % ratio benzylmethacrylate methacrylic acid copolymer at 0.9 wt % with glycerol and ethylene glycol as humectants.

This ink was prepared identically to ink example 82 except that 11.33 g of a 26.49-wt % solution of polyurethane PU-59 was substituted for the polyurethane PU-56.

Ink Example 94

A pigment blue 15:3 cyan ink formulation employing a 135 acid number polycarbonate-type polyurethane 1.2 wt % and a 77.5/22.5 wt % ratio benzylmethacrylate methacrylic acid copolymer at 0.9 wt % with glycerol and ethylene glycol as humectants.

This ink was prepared identically to ink example 82 except that 11.86 g of a 25.3-wt % solution of polyurethane PU-55 was substituted for the polyurethane PU-56.

Ink Example 125

A pigment cyan ink formulation employing a polycarbonate type polyurethane 1.2 wt % and no additional acrylic polymer with glycerol and ethylene glycol as humectants.

Into an approximately 125 ml high density polyethylene bottle with magnetic stirring, the following components were added in order: 60.17 g of high purity water, 0.21 g of a 9.5 wt % solution of the biocide Kordek MLX, 4.50 g of ethylene glycol, 7.50 g of glycerol, 0.75 g of the surfactant Surfynol 465, 4.80 g of a 25.0 wt % solution of polyurethane PU-56, and 22.07 g of cyan pigment dispersion PC-1 containing 9.97 wt-% cyan pigment PB15:3. The resulting 100 g of ink were stirred for at least an hour and filtered with a 1.0 um disk filter.

Ink Example 126

A pigment cyan ink formulation employing a 70 acid number polycarbonate-type polyurethane 1.2 wt % with glycerol and ethylene glycol as humectants.

This ink was prepared identically to ink example 125 except that 4.8 g of a 25.0-wt % solution of polyurethane PU-57 was substituted for the polyurethane PU-56.

Ink Example 127

A pigment cyan ink formulation employing a 76 acid number polycarbonate-type polyurethane 1.2 wt % with glycerol and ethylene glycol as humectants.

This ink was prepared identically to ink example 125 except that 4.88 g of a 24.6-wt % solution of polyurethane PU-50 was substituted for the polyurethane PU-56.

Ink Example 128

A pigment cyan ink formulation employing a 100 acid number polycarbonate-type polyurethane 1.2 wt % with glycerol and ethylene glycol as humectants.

This ink was prepared identically to ink example 125 except that 4.71 g of a 25.5-wt % solution of polyurethane PU-54 was substituted for the polyurethane PU-56.

Ink Example 129

A pigment cyan ink formulation employing a 100 acid number polycarbonate-type polyurethane 1.2 wt % with glycerol and ethylene glycol as humectants.

This ink was prepared identically to ink example 125 except that 4.53 g of a 26.5-wt % solution of polyurethane PU-58 was substituted for the polyurethane PU-56.

Ink Example 130

A pigment cyan ink formulation employing a 135 acid number polycarbonate-type polyurethane 1.2 wt % with glycerol and ethylene glycol as humectants.

This ink was prepared identically to ink example 125 except that 4.74 g of a 25.3-wt % solution of polyurethane PU-55 was substituted for the polyurethane PU-56.

Jetting Results

Each ink was loaded directly into a thermal print head with 6 pL nozzles. At a voltages of 6 and 12% above the threshold voltage for the ink to begun firing, the transit time for each drop to travel 0.3 mm from the nozzle plate was measured for 250 drops at each of a set of varying firing frequencies from 0 to 25,000 Hz. The average velocity and the root mean square variation of the velocity were calculated for 10 different nozzles fired at identical conditions.

TABLE I

| Ink Type | PU # | Base type | Jetting velocity m/s at 12 kHz/24 kHz | Jetting velocity variation % at 12 kHz/24 kHz |
|---|---|---|---|---|
| I-1 Inv. | -1 | 100% with KOH | 15.6/15.7 | 1.20/1.10 |
| I-2 Inv. | -2 | 90% with KOH | 15.3/15.5 | 1.26/0.82 |
| I-3 Comp. | -3 | 90% with NH₄OH | Unable to jet above 11 kHz | Unable to jet above 11 kHz |
| I-4 Comp. | -4 | 45% with NH₄OH, 45% with KOH | Unable to jet above 8 kHz | Unable to jet above 8 kHz |
| I-5 Inv. | -5 | 90% with LiOH | 12.88/13.39 | 2.70/1.37 |
| I-6 Inv. | -6 | 90% with RbOH | 14.49/15.46 | 1.59/1.49 |
| I-7 Comp. | -7 | 100% with triethanol amine | Unable to jet above 9 kHz | Unable to jet above 9 kHz |
| I-8 Inv. | -8 | 85% with KOH | 14.42/14.49 | 1.40/1.40 |

The examples in Table I show that polyurethanes that are neutralized with ammonia or amine compounds jet very poorly in pigment-containing ink in a thermal inkjet print head. Conversely, polyurethanes neutralized with alkali metal bases show jetting behavior that meets the performance requirements for a pigment-based thermal inkjet printing system.

TABLE II

| Ink | Pigment Color | PU-# | acrylic | Humectant | Jetting velocity m/s at 15 kHz 106% Vth | Jetting velocity variation % at 15 kHz 106% Vth |
|---|---|---|---|---|---|---|
| I-51 | colorless | -50 | AC-3 | DEG/Dowanol DB | 6.48 | 2.36 |
| I-52 | colorless | -51 | AC-3 | DEG/Dowanol DB | 8.88 | 2.66 |
| I-53 | colorless | -50 | AC-2 | DEG/Dowanol DB | 21.28 | 3.12 |
| I-54 | yellow | -50 | AC-3 | DEG/Dowanol DB | 22.22 | 9.63 |
| I-55 | yellow | -51 | AC-3 | DEG/Dowanol DB | 13.33 | 3.02 |
| I-56 | yellow | -50 | AC-2 | DEG/Dowanol DB | 18.75 | 3.31 |
| I-57 | colorless | -50 | AC-1 | Glycerol/EG | 17.34 | 1.50 |
| I-57B | colorless | -50 | AC-2 | Glycerol/EG | 13.04 | 1.04 |
| I-58 | yellow | -50 | AC-1 | Glycerol/EG | 17.44 | 1.69 |
| I-58B | yellow | -50 | AC-2 | Glycerol/EG | 14.29 | 1.14 |

The examples in Table II show that inks containing polyurethane and acrylic polymers and a high viscosity humectant show improved performance with respect to jetting velocity and velocity variation relative to those examples without a high viscosity humectant. DEG is diethylene glycol, Dowanol DB is diethylene glycol-n-monobutyl ether, EG is ethylene glycol.

TABLE III

| Ink Type | PU-# | PU Level Wt % | Acrylic level Wt % | Acrylic polymer type | Jetting velocity m/s at 112% Vth 12 kHz/24 kHz | Jetting velocity variation % at 112% Vth 12 kHz/24 kHz |
|---|---|---|---|---|---|---|
| I-12 Comp. | -12 | 1.2 | 0.9 | AC-2 | 10.49/1.61 | 11.36/1.67 |
| I-59 Comp. | -50 | 0.7 | 0.6 | AC-1 | 9.17/10.56 | 6.09/5.32 |
| I-60 Comp. | -50 | 0.7 | 0.6 | AC-2 | 12.82/14.22 | 2.14/1.23 |
| I-61 Inv. | -50 | 1.2 | 0.9 | AC-1 | 17.05/16.85 | 1.19/2.02 |
| I-62 Inv. | -50 | 1.2 | 0.9 | AC-2 | 17.14/17.05 | 1.14/1.76 |
| I-63 Inv. | -50 | 1.2 | 0.9 | AC-4 | 17.75/17.65 | 1.12/1.88 |

The first comparative example I-12 shows that the polyurethane PU-12 made with butanediol and diethylene glycol according to the prior art US 2004/0085419 A1 does not jet with adequate velocity.

The next set of comparative examples I-59 and I-60 show that inks made with lower levels of polyurethane and free acrylic binder polymer where the pigment to polymer ratio is greater than 1.5 show lower jetting velocity and high velocity variation compared to the inventive examples where the pigment to polymer ratio is about 1 or less.

In table V, ink prepared with polyurethanes made with both a very high molecular weight polyol segment at 2900 and polyurethanes made with a low molecular weight polyol segment at 250 showed low jetting velocity and higher velocity variation as compared to inks made with polyurethanes with polyether segments from 650 to 2000 Mw.

Scratch Resistant Polyurethane Based Pigment Inks

A series of cyan, magenta, yellow and black inks were prepared using oleylmethyl taurate as the pigment grinding

TABLE IV

| Ink | PU-# | PU Acid Number | PU molecular weight | Acrylic Polymer | Jetting velocity m/s at 112% Vth 12 kHz | Jetting velocity variation % at 112% Vth 12 kHz | Jetting velocity m/s at 112% Vth 24 kHz | Jetting velocity variation % at 112% Vth 24 kHz |
|---|---|---|---|---|---|---|---|---|
| I-82 Comp. | -56 | 59 | 25.3k | AC-1 | 12.30 | 2.38 | 13.82 | 1.66 |
| I-84 Inv. | -57 | 70 | 23.5k | AC-1 | 16.22 | 1.51 | 15.96 | 1.60 |
| I-86 Inv. | -50 | 76 | 26.1k | AC-1 | 16.95 | 1.13 | 16.48 | 1.87 |
| I-88 Inv. | -54 | 100 | 22.6k | AC-1 | 17.24 | 1.26 | 17.05 | 1.93 |
| I-90 Inv. | -58 | 100 | 14.8k | AC-1 | 14.71 | 1.62 | 14.71 | 1.51 |
| I-92 Inv. | -59 | 110 | 27.6k | AC-1 | 15.71 | 1.34 | 15.96 | 1.71 |
| I-94 Comp. | -55 | 135 | 11.8k | AC-1 | 11.49 | 2.53 | 13.33 | 1.24 |
| I-125 Comp. | -56 | 59 | 25.3k | none | 3.13 | 23.9 | 6.04 | 18.5 |
| I-126 Comp. | -57 | 70 | 23.5k | none | 2.97 | 24.6 | Unable to jet above 21.5 kHz | Unable to jet above 21.5 kHz |
| I-127 Comp. | -50 | 76 | 26.1k | none | 3.26 | 22.8 | 8.88 | 3.85 |
| I-128 Comp. | -54 | 100 | 22.6k | none | 3.00 | 19.4 | 7.65 | 4.34 |
| I-129 Comp. | -58 | 100 | 14.8k | none | 2.56 | 18.4 | 5.70 | 22.1 |
| I-130 Comp. | -55 | 135 | 11.8k | none | 8.04 | 4.69 | 9.06 | 4.68 |

The examples in Table IV show that pigment-based inks made with polyurethanes with an acid number greater than 59 and less than 135 and an acrylic polymer show jetting performance that meets the requirements for a high speed thermal inkjet system. Inks made with polyurethanes but no acrylic show extremely poor jetting performance.

aid and styrene acrylic polymer Trudot® IJ-4655 (Mead Westvaco) to produce a set of pigment based inks formulated as follows:

TABLE V

| Ink | Polyurethane | Mw of polyTHF segment | Mw of overall polyurethane | Acrylic polymer | Jetting velocity m/s at 12 kHz | Jetting velocity variation % at 12 kHz | Jetting velocity m/s at 24 kHz | Jetting velocity variation % at 24 kHz |
|---|---|---|---|---|---|---|---|---|
| I-13 | PU-13 | 2900 | 42500 | AC-1 | 8.60 | 2.56 | 10.0 | 3.93 |
| I-14 | PU-14 | 2000 | 40500 | AC-1 | 16.13 | 1.13 | 16.48 | 2.36 |
| I-15 | PU-15 | 2000 | 27100 | AC-1 | 16.85 | 1.12 | 16.85 | 1.80 |
| I-16 | PU-16 | 1400 | 22200 | AC-1 | 19.1 | 1.46 | 20.3 | 3.51 |
| I-17 | PU-17 | 650 | 20500 | AC-1 | 14.49 | 1.26 | 14.56 | 1.36 |
| I-18 | PU-18 | 250 | 18500 | AC-1 | 7.98 | 3.06 | 9.93 | 3.58 |
| I-19 | PU-19 | 650 | 16200 | AC-1 | 14.77 | 1.63 | 14.63 | 1.62 |
| I-20 | PU-20 | 250 | 25300 | AC-1 | 8.52 | 2.30 | 9.84 | 2.62 |

Cyan A

| Ingredient | Percent |
| --- | --- |
| PB15:3 | 2.2 |
| Trudot IJ-4655 | 1.2 |
| Glycerol | 7.5 |
| Ethylene Glycol | 4.5 |
| Triethanolamine | 0.1 |
| Surfynol 465 | 0.75 |
| Kordex MLX | 0.02 |
| Water | balance to 100% |

Magenta Comparative A

| Ingredient | Percent |
| --- | --- |
| PR 122 | 3.0 |
| Trudot IJ-4655 | 1.2 |
| Glycerol | 8.0 |
| Ethylene Glycol | 5.0 |
| Triethanolamine | 0.1 |
| Surfynol 465 | 0.75 |
| Kordex MLX | 0.02 |
| Water | balance to 100% |

Yellow A

| Ingredient | Percent |
| --- | --- |
| PY155 | 2.75 |
| Trudot IJ-4655 | 1.6 |
| Glycerol | 10 |
| Ethylene Glycol | 2 |
| Tergitol 15-S-5 | 0.75 |
| Kordek MLX | 0.02 |
| Water | balance to 100% |

Photo Black A

| Ingredient | Percent |
| --- | --- |
| PK7 carbon black | 2.5 |
| Trudot IJ-4655 | 1.2 |
| Glycerol | 8 |
| Ethylene Glycol | 4 |
| Triethanolamine | 0.1 |
| Strodex PK-90 | 0.45 |
| Kordek MLX | 0.02 |
| Water | balance to 100% |

A series of magenta colored inks were prepared using a dispersion of pigment red 122 particles, milled with oleylmethyl taurate as a dispersant, as the source of the pigment particles. Each of the inks had the following ingredients given in weight percent; 3% pigment red 122, 5% ethylene glycol, 0.5% SURFYNOL® 465 (Air Products), 0.9% of actylic polymer AC-1, 0.05% triethanolamine and 0.02% biocide. The amount of glycerol (humectant) and polyurethane binder (PU-50) was varied according to the amounts summarized in table VI and the water was adjusted to reach 100%.

TABLE VI

| Ink ID | Weight percent Polyurethane | Weight percent Glycerol | Glycerol to Polyurethane Ratio |
| --- | --- | --- | --- |
| Magenta comparative A | none | none | none |
| 141 | 1.5 | 8 | 5.33 |
| 142 | 1.2 | 8 | 6.67 |
| 143 | 1.2 | 8 | 6.67 |
| 144 | 1.2 | 12 | 10 |
| 145 | 1.2 | 12 | 10 |
| 146 | 0.6 | 8 | 13.33 |
| 147 | 1.2 | 16 | 13.33 |
| 148 | 0.5 | 8 | 16 |
| 149 | 1.2 | 20 | 16.67 |
| 150 | 0.5 | 10 | 20 |
| 151 | 0.6 | 12 | 20 |
| 152 | 0.6 | 16 | 26.67 |
| 153 | 0.5 | 14 | 28 |

Each magenta test ink was loaded into a cartridge compatible with a Canon i960 printer and tested along with the Cyan A, Yellow, A and Black A inks described above. Targets consisting of 64 patches of various combinations of the four inks (used to span the color gamut of colors available from the individual inks) were printed onto a photoglossy media having a fumed alumina topcoat. Prints were held for various times at 73 degrees F. and 50% RH, and scratched with a blunt stylus connected to a Mar Tester under a 150 g load. The number of patches in which a white streak was visible under 7× magnification was tabulated for each ink, at four hold times subsequent to printing, and the results are shown in Table VII.

TABLE VII

Number of Patches Showing Scratches at Various times after Printing

| Ink ID | Glycerol:PU Ratio | 10 minutes | 2 hours | 6 hours | 24 hours |
| --- | --- | --- | --- | --- | --- |
| Magenta comparative A | none | 52 | 47 | 30 | 16 |
| 141 | 5.33 | 32 | 12 | 2 | 0 |
| 142 | 6.67 | 35 | 19 | 6 | 5 |
| 143 | 6.67 | 27 | 12 | 4 | 1 |
| 144 | 10 | 38 | 19 | 8 | 1 |
| 145 | 10 | 34 | 23 | 13 | 1 |
| 146 | 13.33 | 47 | 30 | 14 | 12 |
| 147 | 13.33 | 37 | 26 | 13 | 1 |
| 148 | 16 | 48 | 22 | 9 | 7 |
| 149 | 16.67 | 47 | 27 | 10 | 3 |
| 150 | 20 | 51 | 26 | 6 | 4 |
| 151 | 20 | 48 | 41 | 32 | 19 |
| 152 | 26.67 | 47 | 43 | 39 | 24 |
| 153 | 28 | 40 | 28 | 11 | 6 |

Yellow inks were additionally prepared like Yellow A, except that 0.9 weight percent AC-1 was added and polyurethane (PU-50) was added in place of AC-3. The amounts of glycerol and polyurethane are shown in Table VIII below. These inks were loaded into cartridges compatible with the Canon i960 printer and tested for scratch resistance with Cyan A, Magenta A, and Black A as above. The number of scratches as a function of glycerol:PU-50 are shown in Table VIII.

TABLE VIII

Number of Patches Showing Scratches at Various times after Printing

| Ink ID | Glycerol | PU | Ratio | 10 Min | 2 Hr | 6 Hr | 24 Hr |
|---|---|---|---|---|---|---|---|
| 154 | 20 | 1.6 | 12.5 | 29 | 26 | 16 | 11 |
| 155 | 20 | 0.8 | 25 | 40 | 27 | 22 | 15 |
| 156 | 15 | 0.8 | 18.75 | 37 | 27 | 15 | 13 |
| 157 | 10 | 0.8 | 12.5 | 34 | 26 | 12 | 13 |
| 158 | 15 | 1.6 | 9.38 | 30 | 22 | 3 | 7 |
| 159 | 8 | 1.2 | 6.25 | 25 | 20 | 3 | 3 |
| Yellow Comparative A | 10 | 0 | NA | 50 | 39 | 30 | 20 |

The results in tables VII and VIII show that pigment based inks formulated without a polyurethane binder are poor for scratch resistance compared to inks containing polyurethanes. The results also show that when a polyurethane and humectant are present that the scratch resistance can be improved by limiting the ratio of glycerol to polyurethane to ratios of 10:1 or less. Inks of the present invention require some level of humectant to achieve a high frequency firing, however, a preferred level of humectant may be selected relative to the polyurethane binder in order to deliver highly durable images.

The invention has been described with reference to a preferred embodiment. However, it will be appreciated that variations and modifications can be effected by a person of ordinary skill in the art without departing from the scope of the invention.

The invention claimed is:

1. An ink composition comprising:
   (a) water,
   (b) pigment particles,
   (c) at least one humectant,
   (d) at least one polyurethane having an average molecular weight of at least about 10,000 and a sufficient number of acid groups to provide an acid number from 60 to about 130, and being present at a weight concentration of greater than 0.7%, and
   (e) at least one water soluble acrylic polymer comprising carboxylic acid groups, present at a weight concentration of greater than 0.6%,
   wherein the acid groups on the polyurethane and acrylic polymers are at least partially neutralized only with a monovalent inorganic base.

2. The ink composition of claim 1 wherein the at least one humectant comprises a humectant having a viscosity of at least 40 centapoise at 25 degrees Celsius.

3. The ink composition of claim 1, wherein the at least one humectant comprises a humectant having a viscosity of at least 100 centapoise at 25 degrees Celsius.

4. The ink composition of claim 1, wherein the at least one humectant comprises a polyhydric alcohol compound having at least 3 hydroxy groups.

5. The ink composition of claim 1, wherein the at least one humectant comprises a glycerol.

6. The ink composition of claim 1, wherein the at least one polyurethane has an average molecular weight between about 10,000 and 150,000.

7. The ink composition of claim 1, wherein the at least one polyurethane has an average molecular weight between about 10,000 and 100,000.

8. The ink composition of claim 1, wherein the at least one polyurethane has an average molecular weight between about 20,000 and 50,000.

9. The ink composition of claim 1, wherein the at least one polyurethane comprises polyol segments having a molecular weight greater than 250 and less than 2,900.

10. The ink composition of claim 1, wherein the at least one acrylic polymer has an acid number of at least 115 and a molecular weight of less than about 20,000.

11. The ink composition of claim 1, wherein the viscosity of the ink is less than 3.5 centapoise at 25 degrees Celsius.

12. The ink composition of claim 1, wherein the viscosity of the ink is less than 3.0 centapoise at 25 degrees Celsius.

13. The ink composition of claim 1, wherein the viscosity of the ink is less than 2.5 centapoise at 25 degrees Celsius.

14. The ink composition of claim 1, wherein the viscosity of the ink is less than 2.0 centapoise at 25 degrees Celsius.

15. The ink composition of claim 1, wherein the monovalent inorganic base comprises potassium hydroxide, sodium hydroxide, lithium hydroxide or rubidium hydroxide.

16. The ink composition of claim 1, wherein the ink composition can be jetted from a thermal inkjet device at frequencies of at least 12 kHz with a near nozzle velocity of at least 10 meters/second.

17. The ink composition of claim 16, wherein the ink composition has a velocity variation of less than 2% for at least $5 \times 10^7$ firing events.

18. An ink set comprising two or more pigmented ink compositions each according to claim 1, wherein at least two of such ink compositions comprise different colored pigment particles.

19. An ink set according to claim 18, further comprising a colorless ink composition comprising;
   (a) water,
   b) at least one humectant, and
   (c) at least one polyurethane having an average molecular weight of at least about 10,000 and a sufficient number of acid groups to provide an acid number from 60 to about 130, wherein the acid groups on the polyurethane are at least partially neutralized only with a monovalent inorganic base.

20. An ink set according to claim 19, wherein the colorless ink composition further comprises at least one water soluble acrylic polymer comprising carboxylic acid groups, wherein the acid groups on the acrylic polymer are at least partially neutralized only with a monovalent inorganic base.

* * * * *